US012531214B2

(12) United States Patent
Hwang et al.

(10) Patent No.: US 12,531,214 B2
(45) Date of Patent: Jan. 20, 2026

(54) MANUFACTURING METHOD OF RING-SHAPED ELEMENT FOR ETCHER

(71) Applicant: Solmics Co., Ltd., Pyeongtaek-si (KR)

(72) Inventors: Sung Sic Hwang, Seoul (KR); Jae Bum Lee, Pyeongtaek-si (KR); Jun Rok Oh, Seoul (KR); Kyoung Yeol Min, Yongin-si (KR); Kyung In Kim, Hwaseong-si (KR); Jung Kun Kang, Pyeongtaek-si (KR)

(73) Assignee: Solmics Co., Ltd., Pyeongtaek-si (KR)

( * ) Notice: Subject to any disclaimer, the term of this patent is extended or adjusted under 35 U.S.C. 154(b) by 374 days.

(21) Appl. No.: 17/892,425

(22) Filed: Aug. 22, 2022

(65) Prior Publication Data
US 2022/0406574 A1 Dec. 22, 2022

Related U.S. Application Data

(63) Continuation of application No. 16/536,602, filed on Aug. 9, 2019, now abandoned.

(30) Foreign Application Priority Data

Aug. 13, 2018 (KR) .................. 10-2018-0094196
Jan. 16, 2019 (KR) .................. 10-2019-0005490

(51) Int. Cl.
*H01J 37/32* (2006.01)
*H01J 37/244* (2006.01)
(52) U.S. Cl.
CPC ...... *H01J 37/32642* (2013.01); *H01J 37/244* (2013.01); *H01J 37/3255* (2013.01)
(58) Field of Classification Search
None
See application file for complete search history.

(56) References Cited

U.S. PATENT DOCUMENTS 4,195,066 A * 3/1980 Schwetz ............... C04B 35/563
501/87
6,120,640 A 9/2000 Shih et al.
(Continued)

FOREIGN PATENT DOCUMENTS

CN 102503429 A 6/2012
CN 105924176 A 9/2016
(Continued)

OTHER PUBLICATIONS

Deping, Wang et al., "Structure and Properties of Inorganic Materials," Tongji University Press, 2015, (6 Pages in Korean, 13 Pages in English).

(Continued)

*Primary Examiner* — Farah Taufiq
(74) *Attorney, Agent, or Firm* — NSIP Law

(57) ABSTRACT

A manufacturing method of a ring-shaped element for an etcher, comprises a granulation operation comprising i) a slurry manufacturing process of preparing a slurry by mixing a raw material including boron carbide, a sinterability enhancer with a solvent; and ii) a granulation process of drying the slurry to prepare granulated raw material; a molding operation of manufacturing a green body by molding the granulated raw material; a sintering operation of carbonizing and sintering the green body to manufacture a sintered body; a shape operation of shaping the sintered body to a ring-shaped element for an etcher. The sinterability enhancer comprises one selected from the group consisting of carbon, boron oxide and combinations thereof.

13 Claims, 8 Drawing Sheets

(56) References Cited

U.S. PATENT DOCUMENTS

| | | | |
|---|---|---|---|
| 6,258,741 | B1 | 7/2001 | Kohsaka et al. |
| 6,352,611 | B1 | 3/2002 | Han et al. |
| 6,887,569 | B1 | 5/2005 | Kriven et al. |
| 7,592,279 | B1 | 9/2009 | Speyer et al. |
| 8,377,369 | B2 | 2/2013 | Speyer et al. |
| 10,273,190 | B2 | 4/2019 | Nagatomo |
| 2003/0054188 | A1 | 3/2003 | Ishikawa et al. |
| 2004/0072024 | A1 | 4/2004 | Mori et al. |
| 2005/0271578 | A1 | 12/2005 | Terada et al. |
| 2006/0121239 | A1 | 6/2006 | Furukawa et al. |
| 2006/0151116 | A1 | 7/2006 | Wu |
| 2007/0203012 | A1 | 8/2007 | Oda et al. |
| 2008/0227618 | A1 | 9/2008 | Horiuchi et al. |
| 2008/0279747 | A1 | 11/2008 | Bar-Ziv et al. |
| 2008/0296798 | A1 | 12/2008 | Nunn |
| 2009/0226699 | A1 | 9/2009 | Murata et al. |
| 2012/0107211 | A1 | 5/2012 | Bar-Ziv et al. |
| 2012/0298910 | A1 | 11/2012 | Ando et al. |
| 2014/0056795 | A1* | 2/2014 | Bar-ziv ............... C04B 35/6264 264/29.6 |
| 2018/0201545 | A1* | 7/2018 | Nagatomo ............ C04B 35/645 |
| 2020/0051793 | A1 | 2/2020 | Hwang et al. |

FOREIGN PATENT DOCUMENTS

| | | |
|---|---|---|
| EP | 0 821 397 A2 | 1/1998 |
| JP | 54-95612 A | 7/1979 |
| JP | 3-268303 A | 11/1991 |
| JP | 4-342467 A | 11/1992 |
| JP | 5-201781 A | 8/1993 |
| JP | 5-339079 A | 12/1993 |
| JP | 8-198691 A | 8/1996 |
| JP | 10-46211 A | 2/1998 |
| JP | 1998-063542 A | 10/1998 |
| JP | 11-102900 A | 4/1999 |
| JP | 11-157935 A | 6/1999 |
| JP | 11-279761 A | 10/1999 |
| JP | 2000247743 A * | 9/2000 |
| JP | 2000-302551 A | 10/2000 |
| JP | 2001-15399 A | 1/2001 |
| JP | 3168600 B2 | 5/2001 |
| JP | 2001-261457 A | 9/2001 |
| JP | 2002-265269 A | 9/2002 |
| JP | 2002-533911 A | 10/2002 |
| JP | 2005-18992 A | 1/2005 |
| JP | 2007-230787 A | 9/2007 |
| JP | 2007-247743 A | 9/2007 |
| JP | 2008-133160 A | 6/2008 |
| JP | 2008-524108 A | 7/2008 |
| JP | 2009-179507 A | 8/2009 |
| JP | 2010-107340 A | 5/2010 |
| JP | 2013-16805 A | 1/2013 |
| JP | 2013-98193 A | 5/2013 |
| JP | 2015-115421 A | 6/2015 |
| JP | 2017-135159 A | 8/2017 |
| JP | 2018-26441 A | 2/2018 |
| JP | 2018-155749 A | 10/2018 |
| KR | 10-1995-0015623 A | 6/1995 |
| KR | 10-0341696 B1 | 6/2002 |
| KR | 10-2002-0067257 A | 8/2002 |
| KR | 10-0588265 B1 | 8/2006 |
| KR | 10-2006-0106865 A | 10/2006 |
| KR | 10-2008-0039110 A | 5/2008 |
| KR | 10-2009-0039819 A | 4/2009 |
| KR | 10-2009-0101129 A | 9/2009 |
| KR | 10-2010-0033696 A | 3/2010 |
| KR | 10-2011-0015676 A | 2/2011 |
| KR | 10-2014-0147892 A | 12/2014 |
| KR | 10-2015-0061577 A | 6/2015 |
| KR | 10-1594541 B1 | 2/2016 |
| KR | 10-2016-0129458 A | 11/2016 |
| KR | 10-2018-0080520 A | 7/2018 |
| KR | 10-1870051 B1 | 7/2018 |
| KR | 10-2018-0093814 A | 8/2018 |
| KR | 10-2018-0117275 A | 10/2018 |
| TW | 200835943 A | 9/2008 |
| WO | WO 2009/020635 A2 | 2/2009 |
| WO | WO 2013/069657 A1 | 5/2013 |
| WO | WO 2017/038555 A1 | 3/2017 |
| WO | WO 2018/061778 A1 | 4/2018 |

OTHER PUBLICATIONS

Suri, A. K., et al. "Synthesis and consolidation of boron carbide: a review." *International Materials Reviews* vol. 55. Issue 1 (2010). pp 4-40.

Bouchacourt, Michel, et al. "The correlation between the thermoelectric properties and stoichiometry in the boron carbide phase B4C-B10. 50." *Journal of Materials science* vol. 20. Issue 4 (1985). pp 1237-1247.

"Boron Carbide (B4C)—Properties and Information about Boron Carbide", *AZoM*, Feb. 9, 2001. pp 1-4.

"Preparation and application of boron carbide ceramics", Jan. 2, 2019, https://kknews.cc/zh-tw/news/abzeb6v.html. pp 1-13.

Bouchacourt, Michel, et al. "The correlation between the thermoelectric properties and stoichiometry in the boron carbide phase B4C-B10. 5C." *Journal of Materials science* vol. 20. Issue 4 (1985). pp 1-19.

Suri, A.K. et al., "Synthesis and consolidation of boron carbide: a review", *International Materials Reviews*, vol. 55. Issue 1 (2010). pp 1-39.

Niu, Yu, et al. "In situ investigation of the silicon carbide particles sintering." *Journal of Nanomaterials* 2011 (2011). pp 1-9.

Chao, Xiaoming, et al. "Advanced Structure Materials" Chemical Industry Press, Materials Science and Engineering Publishing Center, Beijing, (2005). (7 pages in English and 4 pages in Chinese).

* cited by examiner

Fig. 1
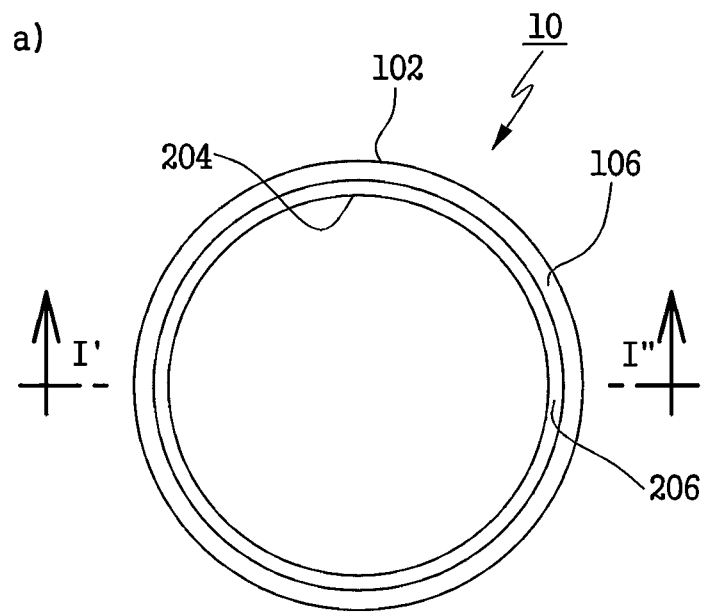
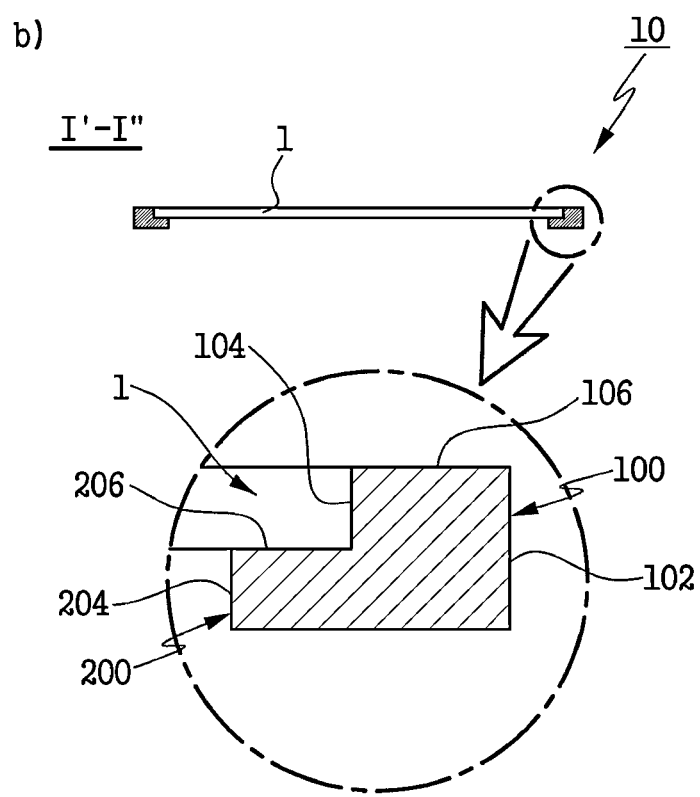

Fig. 10
(a) 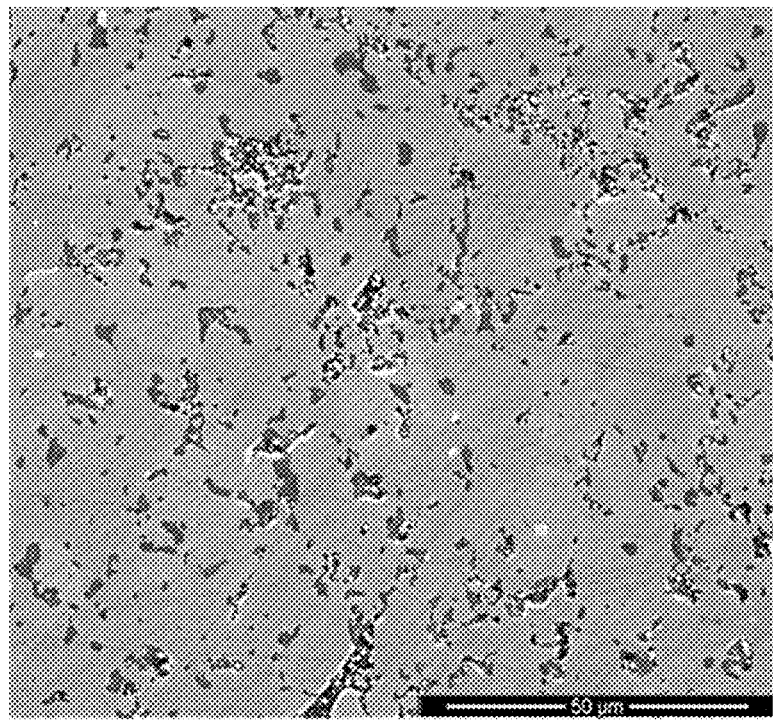
(b) 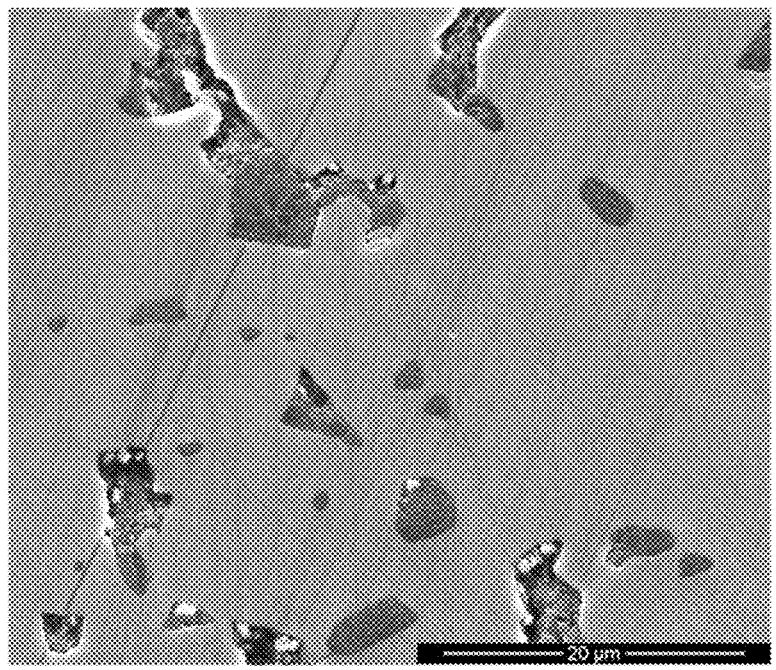

Fig. 11
(a)
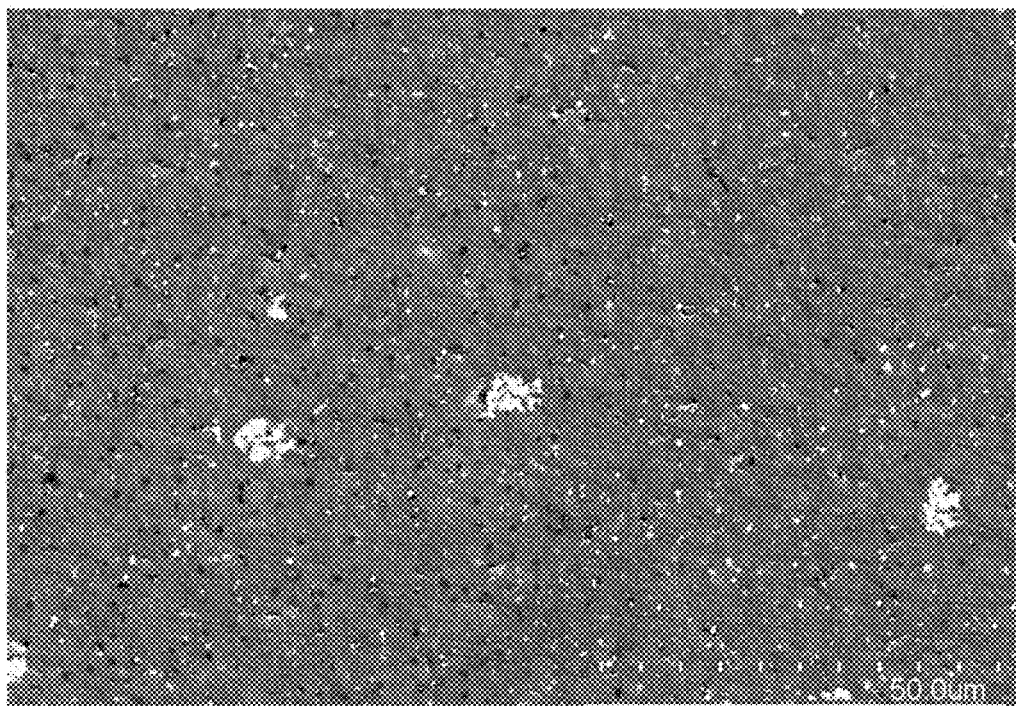
(b)
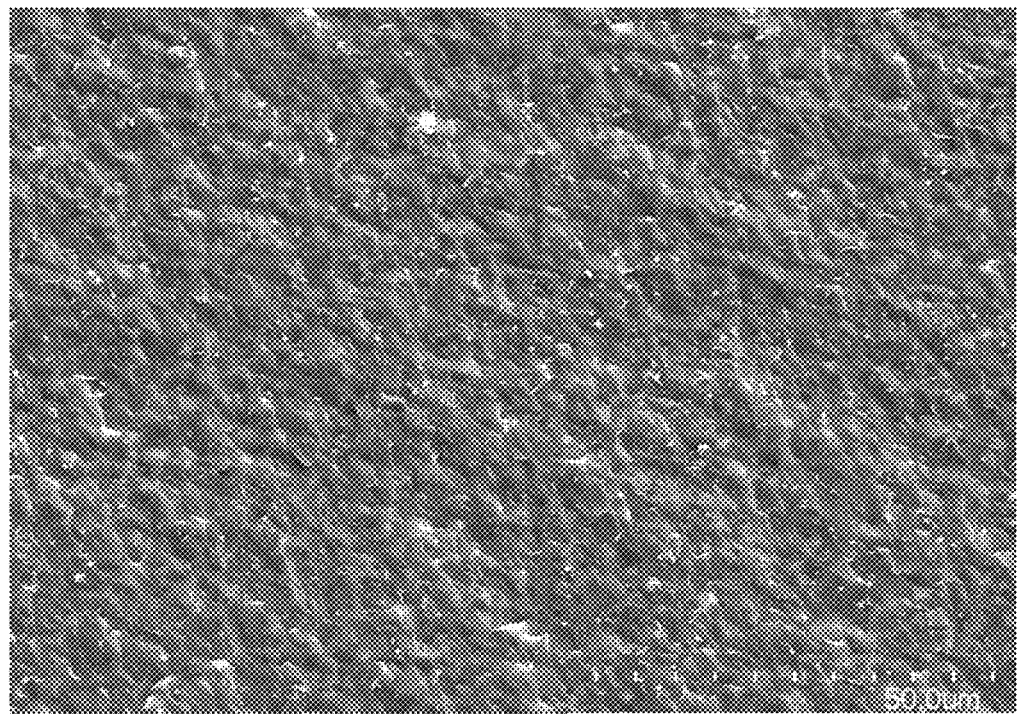

MANUFACTURING METHOD OF RING-SHAPED ELEMENT FOR ETCHER

CROSS REFERENCE TO RELATED APPLICATIONS

This application is a continuation application of U.S. patent application Ser. No. 16/536,602 filed on Aug. 9, 2019, which claims the benefit under 35 U.S.C. 119(a) of Korean Patent Application No. 10-2018-0094196, filed on Aug. 13, 2018, in the Korean Intellectual Property Office and Korean Patent Application No. 10-2019-0005490, filed on Jan. 16, 2019, in the Korean Intellectual Property Office, the entire disclosures of which are incorporated herein by reference for all purposes.

BACKGROUND

1. Field

The present disclosure relates to a manufacturing method of a ring-shaped element for an etcher.

2. Description of the Background

A plasma processing system typically includes a chamber and upper and lower electrodes arranged in the chamber. A substrate such as a semiconductor wafer or a glass substrate may be mounted on the lower electrode and power may be applied between both electrodes. Electrons accelerated by an electric field between both electrodes, electrons emitted from the electrodes or heated electrons collide with molecules of a processing gas to ionize the molecules, and as a result, a plasma of the processing gas is generated. The substrate surface is microprocessed (for example, etched) as desired with active species such as radicals or ions in the plasma.

In recent years, design rules in microelectronics fabrication have decreased gradually. Particularly, there has been an increasing demand for higher dimensional accuracy in plasma etching. Thus, there is a need to use much higher power than ever before. A focus ring accommodated in the plasma processing system may be affected by the plasma treatment.

When high power is applied to the plasma processing system, the distribution of plasma is maximized in the central portion of the substrate surface and is minimized in the edge portion of the substrate as a rule due to the wavelength effect causing the formation of standing waves and the skin effect causing the concentration of the electric field on the central portion of the electrode surface. The non-uniform plasma distribution on the substrate leads to a serious non-uniformity of the plasma treatment, deteriorating the quality of final microelectronic devices.

The focus ring arranged at the edge of the substrate prevents or corrects this imbalance but is likely to be etched by the plasma. Thus, the focus ring needs to be periodically replaced with a new one depending on how much it is etched. The chamber of the plasma processing system needs to be opened to replace the focus ring with a new one. The opening of the chamber and the replacement of the focus ring are main causes of low fabrication yield of microelectronics.

In an attempt to solve such problems, Korean Patent Publication No. 10-1995-0015623 discloses the use of a cover ring. Further, Korean Patent Publication No. 10-2009-0101129 discloses the arrangement of a dielectric between a susceptor and an edge portion to achieve a uniformity of plasma distribution. However, these patent publications have problems in that the structures are complex and a precise design between the dielectric and the edge portion may be difficult to create.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, A manufacturing method of a ring-shaped element for an etcher, comprises a granulation operation comprising i) a slurry manufacturing process of preparing a slurry by mixing a raw material including boron carbide, a sinterability enhancer with a solvent; and ii) a granulation process of drying the slurry to prepare granulated raw material; a molding operation of manufacturing a green body by molding the granulated raw material; a sintering operation of carbonizing and sintering the green body to manufacture a sintered body; a shape operation of shaping the sintered body to a ring-shaped element for an etcher.

The sinterability enhancer may comprise one selected from the group consisting of carbon, boron oxide and combinations thereof.

The sinterability enhancer may comprise 30% by weight or less based on the total amount of the raw material.

The sinterability enhancer may be carbon, the sinterability enhancer may comprises 1% to 30% by weight based on the total amount of the raw material.

The carbon may comprise one selected from the group consisting of a polymer resin, a carbonized form of the polymer resin, and combinations thereof.

The sinterablilty enhancer may comprise boron oxide and carbon, a weight ratio of boron oxide:carbon in the sinterability enhancer may be 1:0.8 to 1:4.

The raw material may comprise 1% to 9% by weight of the boron oxide, the raw material may comprise 5% to 15% by weight of the carbon.

The solvent may comprise one selected from the group consisting of alcohol-based substances, water, and combinations thereof, the slurry may comprise 60% to 80% by volume of the solvent.

The granulation process may be performed by spraying the slurry such that the solvent is removed by evaporation and the granulated raw material is prepared.

A particle diameter of the raw material may be 0.3 μm to 1.5 μm based on $D_{50}$.

The molding operation may be performed by filling the raw material into a mold and pressing the filled raw material, the pressing may be performed at a pressure of 100 MPa to 200 MPa.

The manufacturing method of a ring-shaped element for an etcher according to the claim 1.

The carbonizing of the sintering operation may be performed at a temperature of 600° C. to 900° C.

The sintering of the sintering operation may be performed by maintaining at a temperature of 1800° C. to 2500° C. for 10 hours to 20 hours.

The sintering operation may comprise a process in which a temperature of 100° C. to 250° C. is maintained for 20 to 40 minutes, a process in which a temperature of 250° C. to 350° C. is maintained for 4 to 8 hours, a process in which a temperature of 360° C. to 500° C. is maintained for 4 to 8 hours.

The sintering of the sintering operation is performed at a pressureless condition.

The shape operation may be performed by electrical discharge wire machining.

BRIEF DESCRIPTION OF THE DRAWINGS

FIG. 1 is a conceptual view illustrating the structure of a ring-shaped element according to an embodiment of the present disclosure.

FIG. 10 shows (a) and (b) surface electron microscopy images of focus rings manufactured in Examples 4 and 7, respectively.

FIG. 11 shows (a) and (b) fractured surface electron microscopy images of focus rings manufactured in Examples 7 and 8, respectively.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2:
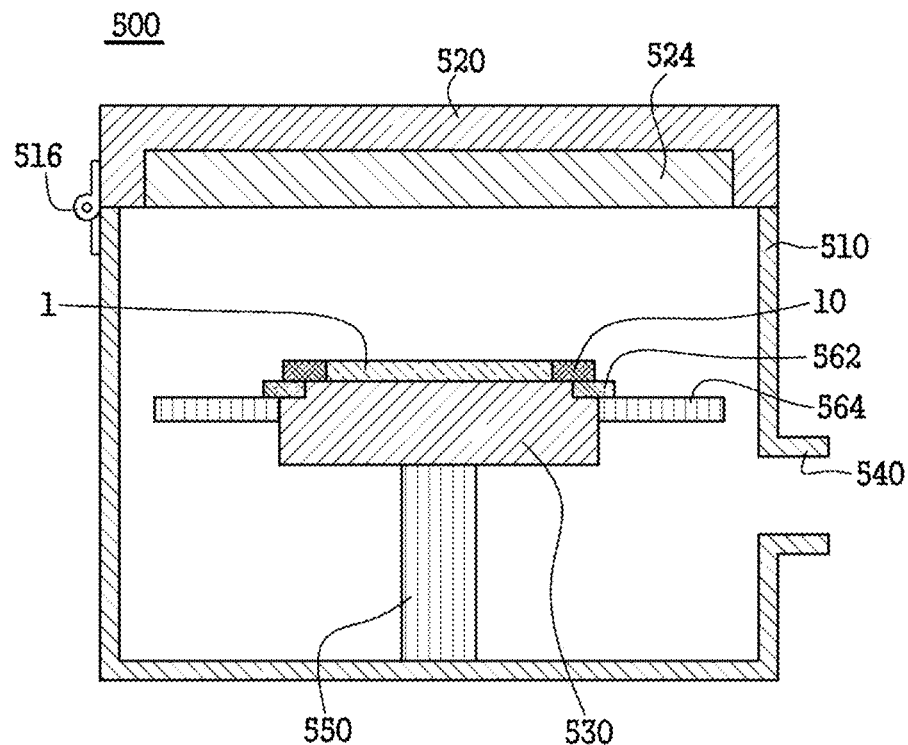
FIG. 2 is a conceptual view illustrating the structure of an etcher using a ring-shaped element according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

In the present specification, the term "combination of" included in Markush type description means mixture or combination of one or more elements described in Markush type and thereby means that the disclosure includes one or more elements selected from the Markush group.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

As used herein, the term "boron carbide" refers to all compounds based on boron and carbon. The boron carbide may optionally include one or more additives and/or doping materials. For example, the boron carbide may include boron and carbon in a total amount of at least 90 mole %, at least 95 mole %, at least 98 mole %, or at least 99 mole %. The boron carbide may exist as a single phase, a multiple phase or a mixed phase thereof. The single-phase boron carbide is intended to include both a stoichiometric phase of boron and carbon and a non-stoichiometric phase of boron and carbon that deviate from the stoichiometric composition. The multiple-phase boron carbide refers to a mixture of at least two compounds based on boron and carbon in a predetermined ratio. As used herein, the term "boron carbide" is intended to include a solid solution containing impurities added to single- or multiple-phase boron carbide and a mixture containing inevitable impurities incorporated during preparation of boron carbide. The impurities may be, for example, iron, copper, chromium, nickel, and aluminum.

The present disclosure is directed to a ring-shaped element for an etcher and a method for etching a substrate using the ring-shaped element.

Figure 3:
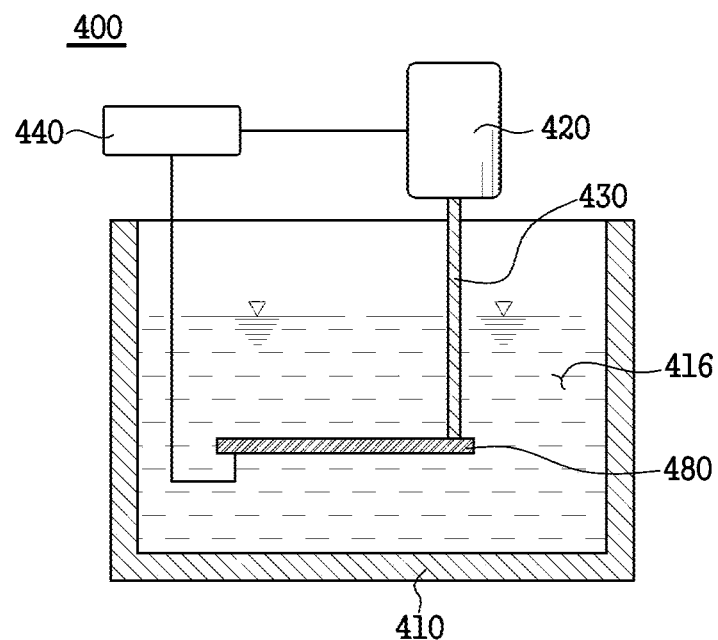
FIG. 3 is a conceptual view illustrating wire discharge machining for processing a ring-shaped element of the present disclosure.
Figure 4:
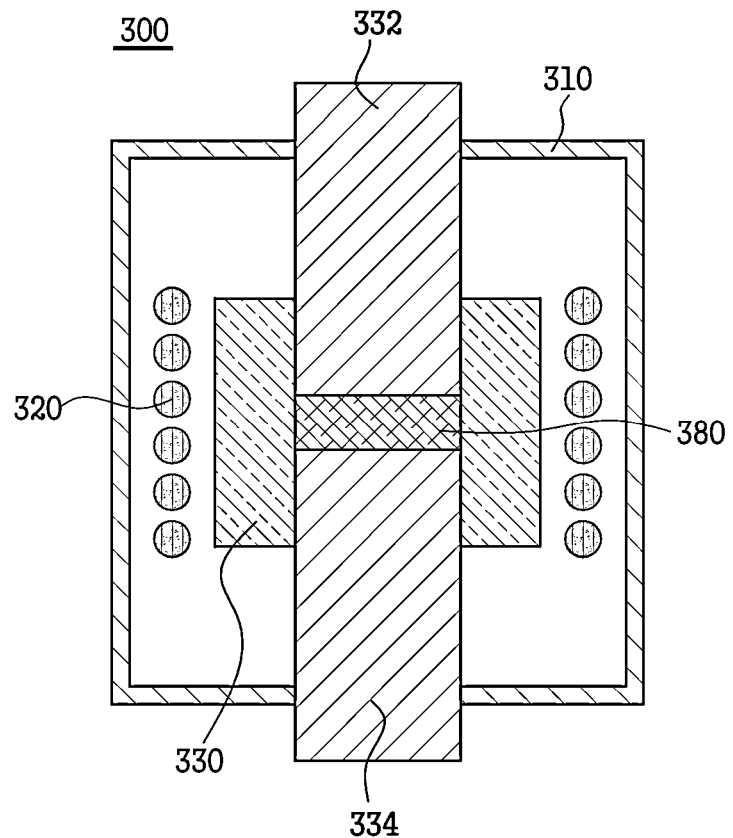
FIGS. 4 and 5 are conceptual views illustrating sintering systems for manufacturing ring-shaped elements according to exemplary embodiments of the present disclosure.
Figure 5:
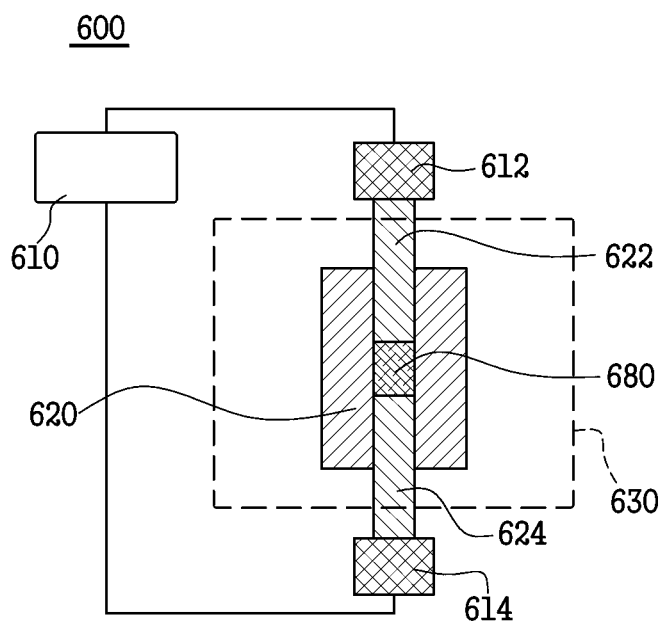
Figure 6:
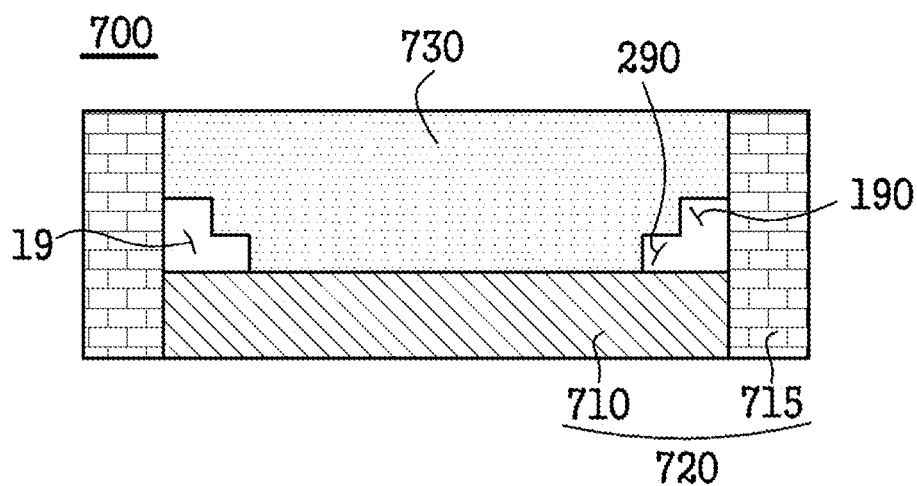
FIGS. 6 and 7 are conceptual views schematically illustrating the structures of molding dies used to manufacture ring-shaped elements according to exemplary embodiments of the present disclosure.
Figure 7:
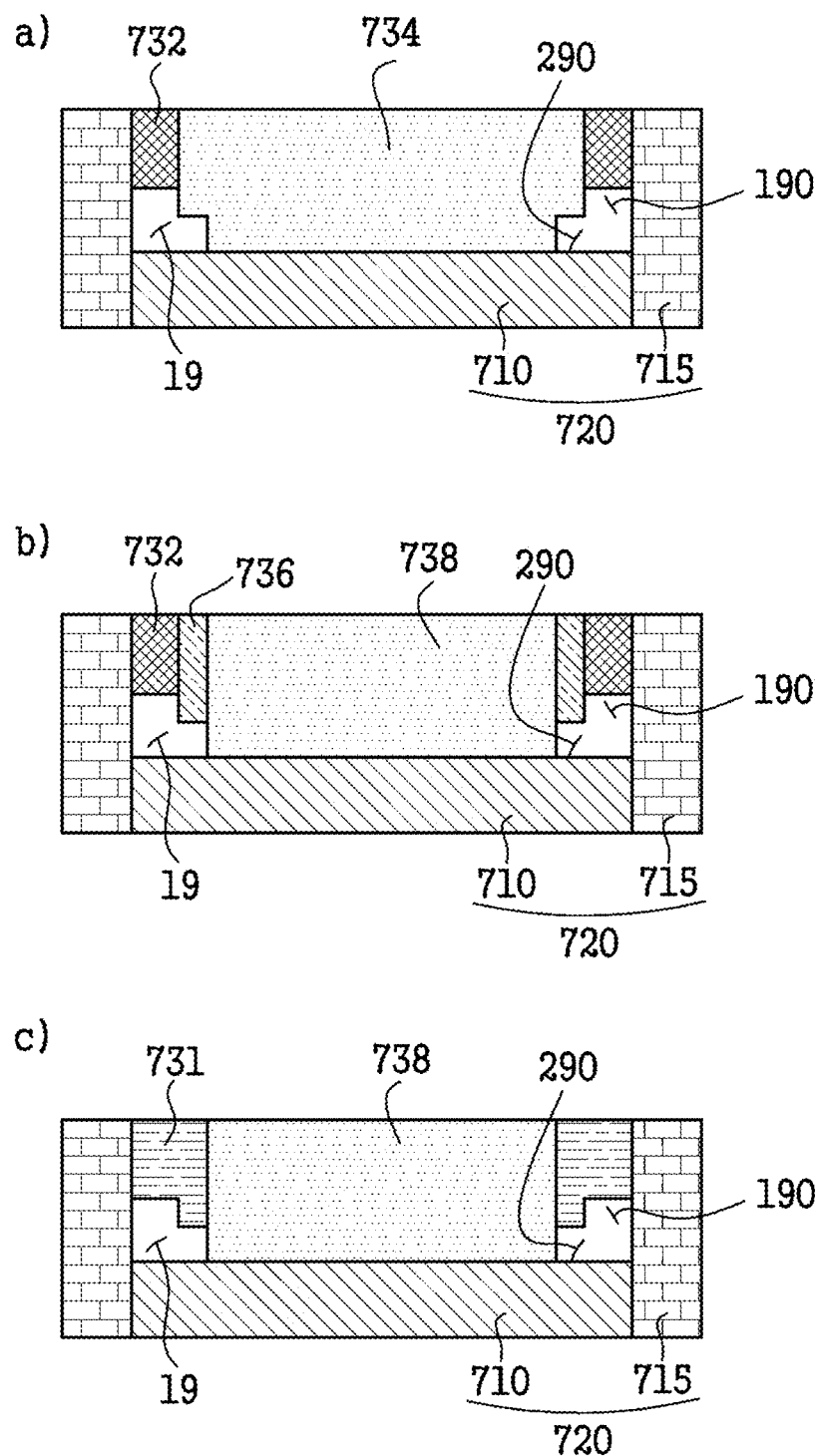

FIG. 1 is a conceptual view illustrating the structure of a ring-shaped element according to an embodiment of the present disclosure, FIG. 2 is a conceptual view illustrating the structure of an etcher using a ring-shaped element according to an embodiment of the present disclosure, FIG. 3 is a conceptual view illustrating wire discharge machining for processing a ring-shaped element of the present disclosure, FIGS. 4 and 5 are conceptual views illustrating sintering systems for manufacturing ring-shaped elements according to exemplary embodiments of the present disclosure, and FIGS. 6 and 7 are conceptual views schematically illustrating the structures of molding dies used to manufacture ring-shaped elements according to exemplary embodiments of the present disclosure. Example ring-shaped elements and example methods for manufacturing the ring-shaped elements will now be described in more detail with reference to FIGS. 1 to 7.

A ring-shaped element 10 for an etcher according to one embodiment of the present disclosure includes a ring-shaped body portion 100 and a mounting portion 200 located in direct contact with and adjacent to the ring-shaped body portion 100. The body portion 100 may be integrally formed with the mounting portion 200.

For example, the ring-shaped element 10 may include a body portion 100 surrounded by an upper surface 106 and a bottom surface spaced a distance from each other, an outer diameter surface 102 connecting the outer contour line of the upper surface 106 and the outer contour line of the bottom surface, and an inner diameter surface 104 connected to the inner contour line of the upper surface 106 and partially or completely surrounding the body portion 100, and a mounting portion 200 surrounded by an upper surface 206 whose outer diameter is directly connected to the inner diameter surface 104 of the body portion and formed at a position lower than the upper surface 106 of the body portion, a bottom surface spaced a distance from the upper surface 206 and connected to the bottom surface of the body portion, and an inner diameter surface 204 connecting the inner contour line of the upper surface 206 and the inner contour line of the bottom surface, wherein the mounting portion has a stepped portion on which a substrate 1 may be mounted.

The surface or entire body of the ring-shaped element may be composed of boron carbide in which boron carbide-containing particles are necked.

The ring-shaped element 10 has a ring-like shape and may be a consumable used in processes, for example, plasma etching, for semiconductor device fabrication. For example, the ring-shaped element 10 may be a focus ring, an edge ring or a confinement ring. For example, the ring-shaped element 10 may be a focus ring on which a substrate is mounted during processing such as plasma etching.

Such a consumable ring-shaped element serves to help plasma etching proceed such that the entire body of a target substrate is relatively uniformly etched as intended. However, the surface of the ring-shaped element is also etched during plasma etching of the substrate. It is efficient to etch the largest possible amount of the substrate in a state in which a chamber is kept closed. For these reasons, it is preferred that the ring-shaped element is more slowly etched than the substrate. It is also preferred that the ring-shaped element has a desired resistance such that the plasma is formed on the substrate at an intended rate in an intended direction.

The ring-shaped element of the present disclosure has a thermal conductivity of 27 W/m·K or less at 400° C. For example, the boron carbide constituting the surface or entire body of the ring-shaped element has a thermal conductivity of 27 W/m·K or less at 400° C. Due to this thermal feature, the ring-shaped element has very small pore diameter, very low porosity, and relatively high corrosion resistance.

The ratio of the thermal conductivity of the ring-shaped element at 25° C. to that of the ring-shaped element at 800° C. is in a constant range further described below. For example, the ratio of the thermal conductivity of the boron carbide at 25° C. to that of the boron carbide at 800° C. is in a constant range as further described below. Due to this feature, the thermal properties of the ring-shaped element are relatively easy to control upon plasma etching and the ring-shaped element has sufficiently good corrosion resistance.

The thermal conductivity of the ring-shaped element 10 refers to the thermal conductivity of the upper surface 106 of the body portion and the upper surface 206 of the mounting portion.

The ratio of the thermal conductivity of the surface or entire body of the ring-shaped element 10 at 25° C. ($HC_{25}$) to that of the surface or entire body of the ring-shaped element 10 at 800° C. ($HC_{800}$) is 1:0.2 to 1:3. For example, the ratio of $HC_{25}$:$HC_{800}$ may be 1:0.26 to 1:1 or 1:0.26 to 1:0.6.

The thermal conductivity of the ring-shaped element 10 may be about 60 W/m·K or less, about 40 W/m·K or less, about 30 W/m·K or less or about 27 W/m·K or less at a temperature selected from the range of 25 to 800° C. The thermal conductivity of the ring-shaped element 10 may be at least about 4 W/m·K or at least about 5 W/m·K at a temperature selected from the range of 25 to 800° C.

The thermal conductivity of the ring-shaped element 10 may be about 80 W/m·K or less or about 31 W/m·K or less at 25° C. The thermal conductivity of the ring-shaped element 10 may be at least about 20 W/m·K or at least about 22 W/m·K at 25° C.

The thermal conductivity of the ring-shaped element 10 may be about 70 W/m·K or less or about 22 W/m·K or less at 400° C. The thermal conductivity of the ring-shaped element 10 may be at least about 7 W/m·K or at least about 8 W/m·K at 400° C.

The thermal conductivity of the ring-shaped element 10 may be about 50 W/m·K or less or about 16 W/m·K or less at 800° C. The thermal conductivity of the ring-shaped element 10 may be at least about 5 W/m·K or at least about 6 W/m·K at 800° C.

The thermal conductivity of the ring-shaped element 10 allows the ring-shaped element 10 to have good etch resistance.

The ring-shaped element 10 may have a relatively high relative density. For example, the ring-shaped element 10 may have a relative density of at least about 90%, at least about 97%, about 97 to about 99.99% or about 98% to about 99.99%.

The relative density of the ring-shaped element 10 whose entire body is composed of boron carbide refers to the relative density of the entire body of the ring-shaped element 10. The relative density of the ring-shaped element 10 whose surface is composed of boron carbide refers to the relative density of the surface (for example, the upper surface 106 of the body portion) of the ring-shaped element 10. The same also applies to the porosity, pore diameter, resistance, and determination of whether particles are formed.

The ring-shaped element 10 may have a porosity of about 10% or less, about 3% or less, about 2% or less or 0.01 to 2%.

For example, the ring-shaped element 10 may have a porosity of about 1% or less, about 0.5% or less or about 0.1% or less. The low porosity of the ring-shaped element indicates the presence of small carbon areas between the particles in a sintered body included in the ring-shaped element and ensures good corrosion resistance of the ring-shaped element.

The average surface or cross-sectional pore diameter of the ring-shaped element 10 may be 5 μm or less. Here, the average pore diameter is defined as the diameter of a circle with the same area as the cross-sectional area of the pore. The average pore diameter may be 3 μm or less. For example, the average pore diameter may be 1 μm or less. The area of pores having a diameter of 10 μm or more accounts for 5% or less of the area of all pores. The boron carbide included in the ring-shaped element 10 may have improved corrosion resistance.

The boron carbide included in the ring-shaped element 10 may have high, medium or low electrical resistance.

For example, the high-resistance boron carbide may have a resistivity of about 10 Ω·cm to about 103 Ω·cm. Here, the high-resistance boron carbide is composed mainly of boron carbide and may include silicon carbide or silicon nitride as a sinterability enhancer.

For example, the medium-resistance boron carbide may have a resistivity of about 1 Ω·cm to about 10 Ω·cm. Here, the medium-resistance boron carbide is composed mainly of boron carbide and may include boron nitride as a sinterability enhancer.

For example, the low-resistance boron carbide may have a resistivity of about $10^{-1}$ Ω·cm to about $10^{-2}$ Ω·cm. Here, the low-resistance boron carbide is composed mainly of silicon carbide and may include carbon as a sinterability enhancer.

For example, the ring-shaped element 10 may have a low resistivity of 5.0 Ω·cm or less, 1.0 Ω·cm or less or $8 \times 10^{-1}$ Ω·cm or less.

The ring-shaped element 10 does not form particles upon contact with halogen ions in a plasma etcher. The particles refer to particulate materials with a diameter of 1 μm or more.

The ring-shaped element 10 is arranged around the substrate 1 in an etcher 500. For example, the substrate 1 is mounted on the ring-shaped element 10. With this arrangement, the ring-shaped element 10 together with the substrate is affected by plasma etching. In this case, the elements exposed from the surface or entire body of the ring-shaped element 10 may be ionized by a plasma or the resulting halogen ions and form bonds with ionized atmospheric elements in the chamber to form unwanted substances. The substances may be gases. In this case, the substances are released from a chamber housing 510 to the outside through a duct 540, and as a result, they have no great influence on the etching of the substrate. Alternatively, the substances may be solids. In this case, the substances may be deposited on the substrate to deteriorate the etching quality of the substrate or cause defects of a final semiconductor device.

The ring-shaped element 10 may not form particles upon reaction with fluorine or chlorine ions in a plasma state. Particularly, the boron carbide constituting the surface or entire body of the ring-shaped element 10 is not etched by a plasma and does not form solid particles even when reacting with fluorine or chlorine ions. This feature distinguishes ring-shaped element 10 from sintered bodies using iridium that react with halogen ions to form particulate impurities, and as a result, it contributes to a considerable reduction in the number of defects in the substrate and a final product during etching in the etcher. For example, the boron carbide constituting the surface or entire body of the ring-shaped element 10 may be relatively inert with respect to halogen ions in an etcher, for example, compared to iridium.

The ring-shaped element 10 has a low etch rate, particularly for a plasma, indicating its good corrosion resistance.

For example, when the etch rate of silicon (Si, single-crystal silicon, produced by the growing method) is defined as 100%, the ring-shaped element 10 may have an etch rate of 55% or less, 10 to 50% or 20 to 45%.

Here, the etch rate is evaluated based on a thickness reduction rate (%). For example, the etch rate is calculated by the proportion of the material (surface of the ring-shaped element 10, for example, the upper surface of the body portion, Si, single-crystal silicon, produced by the growing method; etc.) etched when exposed for 280 hours in a plasma etcher operated at an RF power of 2,000 W.

The etch rate of the ring-shaped element 10 is much lower than that of chemical vapor deposited silicon carbide (CVD-SiC), indicating better etch resistance of the ring-shaped element 10.

For example, when the etch rate of CVD-SiC is defined as 100%, the etch rate of the ring-shaped element 10 may be not higher than 70%.

The roughness Ra of the surface of the ring-shaped element 10, particularly the upper surface 106 of the body portion, may be from about 0.1 μm to about 1.2 μm or from about 0.2 μm to about 0.4 μm. The roughness Ra can be measured using a 3-dimensional measuring machine.

The boron carbide constituting the surface or entire body of the ring-shaped element 10 may contain 500 ppm or less, 300 ppm or less, 100 ppm or less, 10 ppm or less or 1 ppm or less of metallic by-products (impurities).

The boron carbide constituting the surface or entire body of the ring-shaped element 10 may include sintered and necked boron carbide-containing particles having a particle diameter ($D_{50}$) of 1.5 μm or less. For example, the boron carbide may include sintered and necked boron carbide-containing particles having an average particle diameter ($D_{50}$) of about 0.3 μm to about 1.5 μm or about 0.4 μm to about 1.0 μm. The boron carbide may include sintered and necked boron carbide-containing particles having an average particle diameter ($D_{50}$) of about 0.4 μm to about 0.8 μm. If the average particle diameter of the boron carbide particles is excessively large, the resulting sintered body may have low density. Meanwhile, if the average particle diameter of the boron carbide particles is excessively small, poor workability or low productivity may be caused.

The distance between the upper surface 106 of the body portion and the bottom surface of the body portion may be 1.5 to 3 times or 1.5 to 2.5 times that between the upper surface 206 of the mounting portion and the bottom surface of the mounting portion. This difference in distance ensures stable mounting of the substrate and is helpful in efficient etching.

When the outer diameter of the ring-shaped element 10 is defined as 100, the distance between the upper surface 106 of the body portion and the bottom surface of the body portion may be from 0.5 to 5, from 0.5 to 3 or from 0.5 to 2.5. This diameter-to-thickness ratio ensures stable mounting of the substrate on the ring-shaped element 10 and is helpful in efficient etching.

The replacement time of the ring-shaped element 10 may be at least twice that of a ring-shaped element made of single-crystal silicon when the replacement time is defined as the time required for the height of the body portion 100 to fall 10% or more of its initial height by etching of the upper surface of the body portion 106. This slow etching of the upper surface 106 of the body portion of the ring-shaped element 10 means an increase in the opening time interval of the chamber for the purpose of replacing the old element with a new one. The increased opening time interval eventually brings about an improvement in the etching efficiency of the etcher, reduces the possibility that toxic substances may be released when the chamber is opened, and decreases the possibility of contamination of the chamber.

Now, a description will be given of a method for manufacturing the ring-shaped element 10.

The ring-shaped element 10 can be manufactured by producing boron carbide having a shape approximating that of the ring-shaped element and processing the boron carbide into the shape of the final corrosion resistant ring-shaped element 10, which has been described above. However, the boron carbide material is difficult to process because the atoms of boron carbide form strong covalent bonds. Thus, a special process such as wire discharge machining or surface discharge machining is required to process the boron carbide material into the shape of the final product.

For example, a method for manufacturing the ring-shaped element 10 includes primary molding and sintered body formation. The method may further include granulation before the primary molding. The method may further include processing the sintered body after the sintered body formation.

The granulation step includes mixing raw materials including boron carbide with a solvent to prepare a slurry of the raw materials and drying the slurry of the raw materials to prepare spherical granules of the raw materials.

The raw materials may include boron carbide and a sinterability enhancer.

The boron carbide is represented by $B_4C$ and may be in the form of a powder. The content of boron carbide in the boron carbide powder is not particularly limited and may be as high as 99.9% by weight, greater than 99.9% by weight, or as low as 95% to less than 99.9% by weight.

The boron carbide powder may have an average particle diameter ($D_{50}$) of about 1.5 μm or less, about 0.3 μm to about 1.5 μm or about 0.4 μm to about 1.0 μm. The boron carbide powder may have an average particle diameter ($D_{50}$) of about 0.4 μm to about 0.8 μm. If the average particle diameter of the boron carbide powder is excessively large, the resulting sintered body may have low density and poor corrosion resistance. Meanwhile, if the average particle diameter of the boron carbide powder is excessively small, poor workability or low productivity may be caused.

The sinterability enhancer included in the raw materials serves to improve the physical properties of the boron carbide. For example, the sinterability enhancer may be selected from the group consisting of carbon, boron oxide, silicon, silicon carbide, silicon oxide, boron nitride, silicon nitride, and combinations thereof.

The sinterability enhancer may be present in an amount of about 30% by weight, based on the total weight of the raw materials. For example, the sinterability enhancer may be present in an amount of about 0.001% to about 30% by weight, 0.1% to 25% by weight or 5 to 25% by weight, based on the total weight of the raw materials. The presence of the sinterability enhancer in an amount exceeding 30% by weight may lead to a deterioration in the strength of the sintered body.

The boron carbide (for example, in the form of a powder) makes up the remainder of the raw materials. The sinterability enhancer may include boron oxide, carbon or a combination thereof.

Carbon as the sinterability enhancer may be added in the form of a resin such as a phenolic resin. The resin may also be used after carbonization. The carbonization may be performed by any suitable process for carbonizing polymer resins.

Carbon as the sinterability enhancer may be used in an amount of 1 to 30% by weight, 5 to 30% by weight, 8 to 28% by weight or 13 to 23% by weight. The use of carbon as the sinterability enhancer in the amount defined above increases the necking between the particles, makes the size of the particles relatively large, and leads to a relatively high relative density of the boron carbide. However, if the content of the carbon exceeds 30% by weight, the residual carbon may form carbon areas, resulting in a reduction in the hardness of the boron carbide.

Alternatively, boron oxide may be used as the sinterability enhancer. The boron oxide is represented by $B_2O_3$ and chemically reacts with carbon present in pores of the sintered body to form boron carbide and assists in discharging residual carbon, making the sintered body dense.

Alternatively, a combination of boron oxide and carbon may be used as the sinterability enhancer. The use of boron oxide and carbon can further increase the relative density of the sintered body, can reduce the presence of carbon areas in the pores, and can improve the compactness of the sintered body.

The boron oxide and the carbon may be used in a weight ratio ranging from 1:08 to 1:4, from 1:1.2 to 1:3 or from 1:1.5 to 1:2.5. Within this range, the relative density of the sintered body can be improved. For example, the raw materials may contain 1 to 9% by weight of the boron oxide and 5 to 15% by weight of the carbon. In this case, the sintered body may have a high degree of compaction and few defects.

The sinterability enhancer may have a melting point in the range of about 100° C. to about 1000° C. For example, the additive may have a melting point in the range of about 150° C. to about 800° C. or about 200° C. to about 400° C. With this range, the additive can easily diffuse between the boron carbide particles during sintering of the raw materials.

In the granulation step, the solvent is used to slurry the raw materials. The solvent may be an alcohol such as ethanol or water. The solvent may be used in an amount of about 60% to about 80% by volume, based on the total volume of the slurry.

The raw materials can be slurried by ball milling. For example, polymer balls may be used for ball milling. The slurrying may be performed for about 5 hours to about 20 hours.

The granulation can be performed by spraying the slurry such that the solvent is removed by evaporation and the raw materials are granulated. The granulated particles of the raw materials have a round shape as a whole and are relatively constant in size.

The particle diameter ($D_{50}$) of the raw materials may be in the range of about 0.3 to about 1.5 μm, about 0.4 μm to about 1.0 μm or about 0.4 μm to about 0.8 μm.

This range facilitates filling of the granulated particles of the raw materials in a mold and ensures improved workability of the granulated particles of the raw materials during the subsequent primary molding to produce a green body.

In the primary molding step, the raw materials including boron carbide are molded into a green body. For example, the molding may be performed by filling the raw materials in a mold (for example, a rubber mold) and pressing the filled raw materials. For example, the molding may be performed by cold isostatic pressing (CIP).

The primary molding by cold isostatic pressing is made efficient when a pressure of about 100 MPa to about 200 MPa is applied.

The size and shape of the green body are appropriately determined taking into consideration the application of the sintered body.

Preferably, the green body is designed to be slightly larger in size than the final sintered body. Since the strength of the sintered body is higher than that of the green body, it may be efficient to shorten the time required to process the sintered body. For this purpose, the method may further include removing unnecessary portions from the green body to process the shape of the green body after the primary molding.

In the sintered body formation step, the green body is carbonized and sintered to produce boron carbide.

The green body can be carbonized at a temperature of about 600° C. to about 900° C. The carbonization enables the removal of a binder and unnecessary impurities from the green body.

For the subsequent sintering, the carbonized green body can be maintained at a temperature of about 1800° C. to about 2500° C. for about 10 hours to about 20 hours. The sintering allows for growth and necking of the particles of the raw materials and densifies the sintered body.

The sintering can be performed with a temperature profile consisting of heating, maintenance, and cooling. For example, the temperature profile consists of primary heating, maintenance of the primary heating temperature, secondary heating, maintenance of the secondary heating temperature, tertiary heating, maintenance of the tertiary heating temperature, and cooling.

The heating rate may be from about 1° C./min to about 10° C./min. For example, the heating rate may be from about 2° C./min to about 5° C./min.

For the sintering, a temperature of about 100° C. to about 250° C. may be maintained for about 20 minutes to about 40 minutes. For the sintering, a temperature zone of about 250° C. to about 350° C. may be maintained for about 4 hours to about 8 hours. For the sintering, a temperature zone of about 360° C. to about 500° C. may be maintained for about 4 hours to about 8 hours. When the temperature zone is maintained for the predetermined time, the additive can easily diffuse and the phase of the boron carbide is made uniform.

For the sintering, a temperature zone of about 1800° C. to about 2500° C. may be maintained for about 10 hours to about 20 hours. In this case, the sintered body can be made stronger.

The cooling rate may be from about 1° C./min to about 10° C./min. For example, the cooling rate may be from about 2° C./min to about 5° C./min.

The resulting boron carbide may be subjected to additional processing such as surface processing and/or shape processing.

The surface processing is a process for planarizing the surface of the sintered body and may be performed by any suitable process for ceramic planarization.

The shape processing refers to a process for removing or cutting off portions of the sintered body to obtain an intended shape. The shape processing may be performed by electrical discharge machining because the high degree of compaction and high strength of the boron carbide should be taken into consideration. For example, the shape processing may be performed by electrical discharge wire machining.

For example, the sintered body 480 is immersed in a machining solution 416 in a housing 410 of a machining unit of the wire discharge machining system illustrated in FIG. 3 and a wire carrier 420 connected to a wire electrode 430 (for example, a copper wire electrode) is connected to a power supply 440. With this arrangement, when power is applied from the power supply 440 connected to the sintered body 480 and the wire carrier 420, the wire is reciprocated by the wire carrier 420 to cut off target portions of the sintered body 480. The power may be direct current power that has a voltage of about 100 volts to about 120 volts. The machining rate may be from about 2 mm/min to about 7 mm/min, the wire speed may be from about 10 rpm to about 15 rpm, the tension of the wire may be from about 8 g to about 13 g, and the diameter of the wire may be from about 0.1 mm to about 0.5 mm.

The ring-shaped element 10 thus processed may be optionally subjected to surface processing.

Another method for manufacturing the ring-shaped element 10 will be described below.

The method includes the steps of preparation, arrangement, and molding.

In the preparation step, raw materials including boron carbide are poured into a ring-shaped cavity 19 of a molding die 700.

The ring-shaped cavity 19 may include a cavity 190 for a body portion and a cavity 290 for a mounting portion located adjacent to each other and having respective stepped portions distinguished from each other. The height of the cavity 190 may be greater than that of the cavity 290. Example details of the ring-shaped cavity 19 can be found in the description of the molding die 700 that follows.

The boron carbide is represented by $B_4C$ and may be in the form of a powder.

A boron carbide powder may be used as one of the raw materials and at least one additive may be used as another raw material. Alternatively, only a boron carbide powder may be used as a raw material. The content of boron carbide in the boron carbide powder may be as high as 99.9% by weight or as low as 95% to less than 99.9% by weight.

The boron carbide powder may have an average particle diameter ($D_{50}$) of about 1.5 µm or less, about 0.3 µm to about 1.5 µm or about 0.4 µm to about 1.0 µm. The boron carbide powder may have an average particle diameter ($D_{50}$) of about 0.4 µm to about 0.8 µm. The use of the boron carbide powder enables the production of boron carbide having a dense structure with few pores.

The additive forms a boron carbide solid solution in some or all portions of the boron carbide to impart functionality to the boron carbide.

The additive may be a sinterability enhancer for the purpose of improving the sintering characteristics of the boron carbide. The sinterability enhancer may be selected from the group consisting of carbon, boron oxide, silicon, silicon carbide, silicon oxide, boron nitride, silicon nitride, and combinations thereof. The sinterability enhancer may include boron oxide, carbon or a combination thereof. Carbon as the sinterability enhancer may be added in the form of a resin. The resin may also be used after carbonization. The carbonization may be performed by any suitable process for carbonizing polymer resins.

The sinterability enhancer may be present in an amount of about 30% by weight or less, about 0.1% to about 30% by weight, 1% to 25% by weight or 5% to 25% by weight, based on the total weight of the raw materials. The presence of the sinterability enhancer in an amount exceeding 30% by weight may lead to a deterioration in the strength of the final sintered body.

The boron carbide may be a boron carbide sintered body or a hydrocarbon material having physical properties equivalent to those of a boron carbide sintered body. For example, the boron carbide may include boron carbide in the form of a sintered body (i.e. a boron carbide sintered body) or boron carbide deposited by chemical and/or physical vapor deposition.

The molding die 700, 330 or 620 may be an assembly consisting of two or more separate pieces. Examples of the shape and role of the molding die 700, 330 or 620 will be described below.

The raw materials are placed in the ring-shaped cavity 19. Thereafter, the boron carbide is placed in the ring-shaped cavity 19.

The preparation step may include: introducing the raw materials 380 or 680 into a die housing 720 including a bottom surface portion 710 and an outer surface portion 715 surrounding a space on the bottom surface portion 710; and fitting an overlying upper surface portion 730 into the underlying die housing 720 into which the raw materials are introduced.

The upper surface portion 730 is partially or completely movable upward and downward relative to the die housing 720. The upward and downward movement of the upper surface portion 730 facilitates the transfer of a pressure to the raw materials when the raw materials are pressurized by pressing members 332 and 334 or 622 and 624 in a sintering system 300 or 600, enabling the production of a sintered body having a dense texture.

Alternatively, the preparation step may include: arranging an inner diameter upper surface portion 738 in a die housing 720 including a bottom surface portion 710 and an outer surface portion 715 surrounding a space on the bottom surface portion (primary arrangement); introducing the raw materials into a ring-shaped cavity 19 of the die housing 720 in which the inner diameter upper surface portion 738 is arranged; and arranging i) an upper surface portion 736 covering a body portion and a mounting portion or ii) an upper surface portion 736 covering a mounting portion and an upper surface portion 732 covering a body portion on the raw materials (secondary arrangement).

i) The upper surface portion 736 covering a body portion and a mounting portion or ii) the upper surface portion 736 covering a mounting portion and the upper surface portion 732 covering a body portion may be movable upward and downward relative to the die housing 720. The upward and downward movement facilitates the transfer of a pressure to the raw materials when the raw materials are pressurized by pressing members 332 and 334 or 622 and 624 in a sintering system 300 or 600, enabling the production of a sintered body having a dense texture.

The molding die can be made of a material such as graphite that has relatively high strength at high temperatures. Thus, a high sintering pressure can be applied to the molding die. If needed, a reinforcement portion may be added to reinforce the molding die.

The reinforcement portion (not illustrated) serves to protect the molding die 700 from damage caused when a force delivered by the pressing members 332 and 334 or 622 and 624 is transferred to the outer surface portion 715. The reinforcement portion may be an additional reinforcing housing (not illustrated) surrounding the outer surface portion 715 or the die housing 720.

The reinforcement portion serves to protect the molding die from damage caused by a pressure applied during sintering. Damage to the molding die increases the possibility that the sintered body may not have an intended shape or intended physical properties (strength, relative density, etc.).

In the arrangement step, the molding die 700, 330 or 620 is loaded into a sintering furnace 310 or chamber 630 and pressing members 332 and 334 or 622 and 624 are set.

Any sintering furnace or chamber capable of creating a high temperature and high pressure environment in which the boron carbide can be produced may be used without limitation. The sintering furnace 310 and the chamber 630 are exemplified in the sintering systems illustrated in FIGS. 4 and 5, respectively.

In the molding step, a sintering temperature and a sintering pressure are applied to the molding die 700, 330 or 620 to form boron carbide from the raw materials.

The molding die 700, 330 or 620 has a cavity. The cavity is previously formed corresponding to a desired shape of the final product.

The sintering temperature may be from about 1800 to about 2500° C. or about 1800 to about 2200° C. The sintering pressure may be from about 10 to about 110 MPa, from about 15 to about 60 MPa or about 17 to about 30 MPa. The molding at the sintering temperature and the sintering pressure ensures the production of the boron carbide sintered body with high quality and the ring-shaped element including the boron carbide sintered body in an efficient manner.

The sintering time may be from 0.5 to 10 hours, 0.5 to 7 hours or 0.5 to 4 hours.

The sintering time is very short compared to that in a sintering process performed at ambient pressure. Despite the short sintering time, the sintered body has quality equal to or higher than that produced by a sintering process performed at ambient pressure.

The molding step may be carried out in a reducing atmosphere. In this case, possible reaction products (such as boron oxide) between the boron carbide powder and oxygen in air are reduced, and as a result, the boron carbide contains a larger amount of boron carbide.

The molding step may be carried out while a spark is generated in gaps between the particles in the sintering furnace 600. In this case, pulsed electrical energy is applied to the molding die 620 through electrodes 612 and 614 connected to the corresponding pressing members 622 and 624. The application of pulsed electrical energy in the molding step enables the production of the dense sintered body in a short time.

For example, the molding step may be carried out in the sintering system 300 (hot pressing system) illustrated in FIG. 4. In this case, the raw materials 380 are poured into the molding die 330 located between the upper pressing member 332 and the lower pressing member 334 in the sintering furnace 310 and heated by a heating unit 320, and a pressure is applied to the molding die to sinter the raw materials simultaneously with or separately from the heating. Here, the sintering may be performed under controlled reduced pressure or in a reducing atmosphere in the sintering furnace 310. For example, a carbon die may be used as the molding die 330. Carbon tools (punches) may be utilized as the upper and lower pressing members 332 and 334. The use of the sintering system 300 can avoid the need for an additional molding process such as wire discharge machining or surface discharge machining.

The maximum sintering temperature zone in the molding step may be from about 1900° C. to about 2200° C. and may be maintained for about 2 hours to about 5 hours. Here, the pressure applied to the molding die 330 may be from about 15 MPa to about 60 MPa. For example, the pressure applied to the molding die 330 may be from about 17 MPa to about 30 MPa.

For example, the molding step may be carried out in the sintering system 600 (spark plasma sintering system) illustrated in FIG. 5. In this case, the raw materials 680 are poured into the molding die 620 located between the upper pressing member 622 and the lower pressing member 624 in the chamber 630 and heated by a heating unit (not illustrated), and a pressure is applied to the molding die to sinter the raw materials simultaneously with or separately from the heating. Here, electrical energy may be applied from a power supply 610 to the first electrode 612 and the second electrode 614 to promote sintering of the raw materials in the chamber. For example, the power supply 610 may apply a pulsed direct current to the electrodes.

For example, a carbon die may be used as the molding die 620. Electrically conductive punches such as metal punches may be used as the upper and lower pressing members 622 and 624. The use of the sintering system 600 can avoid the need for an additional molding process such as wire discharge machining or surface discharge machining.

The maximum sintering temperature zone in the molding step may be from about 1800° C. to about 2200° C. and may be maintained for about 2 hours to about 5 hours. Here, the pressure applied to the molding die 620 may be from about 50 MPa to about 80 MPa. For example, the pressure applied to the molding die 620 may be from about 55 MPa to about 70 MPa.

A molding die 700 according to a further embodiment of the present disclosure may include a die housing 720 including a bottom surface portion 710 and an outer surface portion 715 surrounding a space on the bottom surface portion 710, and an upper surface portion 730 fitted into the die housing 720 wherein a ring-shaped cavity 19 is formed as a space between the upper surface portion 730 and the inner surface of the die housing 720.

The bottom surface portion 710 may be integrally formed with the outer surface portion 715. That is, the die housing 720 is made in one piece. Alternatively, the bottom surface portion 710 is separable from or combinable with the outer surface portion 715. That is, the die housing 720 may be of a split type.

The ring-shaped cavity of the molding die 700 has a shape and appearance corresponding to a final product. The presence of the ring-shaped cavity assists in manufacturing dense and corrosion resistant boron carbide in an efficient manner. That is, the molding die can be used to produce boron carbide, for example a ring-shaped boron carbide sintered body. For example, the molding die is of great utility in the manufacture of a boron carbide focus ring.

Constituent parts of the molding die 700 are made of materials that can withstand high temperatures and high pressures. Examples of such materials include graphite and graphite-containing composite materials.

The ring-shaped cavity 19 of the molding die 700 may include a cavity 190 for a body portion and a cavity 290 for a mounting portion located adjacent to each other and having respective stepped portions distinguished from each other. The cavity 190 and the cavity 290 correspond to the body portion 100 and the mounting portion 200 of the corrosion resistant ring-shaped element 10 described above, respectively. When a substrate 1 is arranged on the ring-shaped element 10, it can be stably mounted on the stepped portion of the mounting portion. In an example, the stepped portions are dimensioned such that the cavity 190 is higher than the cavity 290.

The upper surface portion 730 may include: an upper surface portion 732 located on the cavity 190; and an upper surface portion 734 being outside the range of the body portion and including a first surface disposed in direct contact with the inner circumferential surface of the upper surface portion 732 and located on the cavity 290 and a second surface separated from the first surface through a stepped portion and protruding beyond the first surface.

Alternatively, the upper surface portion 730 may include: an upper surface portion 732 located on the cavity 190; an upper surface portion 736 disposed in direct contact with the inner circumferential surface of the upper surface portion 732, located on the cavity 290 to cover the mounting portion, and having a larger thickness than the upper surface portion 732; and an inner diameter upper surface portion 738 disposed in direct contact with the inner circumferential surface of the upper surface portion 736 and having a larger thickness than the upper surface portion 736.

Alternatively, the upper surface portion 730 may include: an upper surface portion 731 located on the ring-shaped cavity 19 and forming the upper surfaces of the cavity 190 and the cavity 290 with different heights to cover the body portion and the mounting portion; and an inner diameter upper surface portion 738 located in direct contact with the inner circumferential surface of the upper surface portion 731 and having a larger thickness than the upper surface portion 736.

As described above, the upper surface portion 730 consists of one, two or three pieces such that the raw materials in the form of a powder are convenient to pour into the ring-shaped cavity and a pressure applied to the corresponding piece is substantially uniformly transferred to all raw materials.

The use of the method, which includes directly introducing powdery raw materials into the molding die and sintering the raw materials, enables the manufacture of the corrosion resistant boron carbide-containing ring-shaped element 10 having substantially the same shape as a finished product after processing in a simpler and more efficient manner.

The method has another advantage in that the resulting boron carbide has excellent physical properties.

Another method for manufacturing the ring-shaped element 10 will be described below.

The ring-shaped element 10 can be manufactured by deposition. For example, the surface or entire body of the ring-shaped element 10 may be manufactured by a vapor deposition process such as bulk CVD. For example, the ring-shaped element 10 may be manufactured through a series of operations: deposition of CVD boron carbide (BC) on a substrate, removal of the substrate, shape processing, polishing, measurement, and cleaning.

First, a boron carbide film is formed on a substrate (mainly a graphite substrate) by CVD. The substrate may be removed by physical vapor deposition of sufficient amounts of gaseous materials on the substrate.

Then, the ring-shaped element 10 is processed into a predetermined shape by mechanical machining and is polished to make its surface smooth. Thereafter, the ring-shaped element 10 is checked for quality and contaminants are removed therefrom. Some of the operations may be omitted or one or more other operations may be added without departing from the scope of the present disclosure.

A boron source gas and a carbon source gas may be used as the gaseous materials for the CVD process. The boron source gas may contain a gas selected from the group consisting of $B_2H_6$, $BCl_3$, $BF_3$, and combinations thereof. The carbon source gas may contain $CF_4$.

For example, the boron carbide used in the ring-shaped element 10 may be produced by deposition of $B_2H_6$ as a boron precursor at a temperature of 500 to 1500° C. in a chemical vapor deposition system.

Various deposition or coating processes may be applied to the manufacture of the ring-shaped element 10. Any process for coating a thick boron carbide layer may be used without limitation and examples thereof include physical vapor deposition, room temperature spray, aerosol spray, and plasma spray.

According to the physical vapor deposition process, for example, a boron carbide target may be sputtered in an argon (Ar) gas atmosphere. The coating layer formed by the physical vapor deposition process can be referred to as a thick PVD boron carbide coating layer.

According to the room temperature spray process, a boron carbide powder may be pressurized at room temperature such that it is sprayed on a base material through a plurality of discharge holes to form a boron carbide layer. The boron carbide powder may be sprayed in the form of granules under vacuum. According to the cold spray process, a boron carbide powder may be sprayed on a base material through a plurality of discharge holes under a flow of compressed gas at a temperature higher by approximately 60° C. than room temperature to form a boron carbide layer in the form of a coating layer. According to the aerosol spray process, a boron carbide powder is mixed with a volatile solvent such as polyethylene glycol or isopropyl alcohol and the resulting aerosol is sprayed on a base material to form a boron carbide layer. According to the plasma spray process, a boron carbide powder is injected into a hot plasma jet and the molten powder is sprayed on a base material to form a boron carbide layer.

FIG. 2 illustrates an etcher 500 according to a further embodiment of the present disclosure. In the etcher 500, an upper chamber assembly 520 is connected to a chamber housing 510 through a connector 516 and is provided with an electrode plate assembly 524 including electrodes. A substrate holder 530 is provided in the chamber housing 510. The substrate holder 530 can be moved upward and downward by a lift mechanism 550. The ring-shaped element 10 as a focus ring is placed at a position where a substrate 1 is mounted. A baffle plate 564 may be provided around the substrate holder 530. A shield ring 562 may be further provided between the substrate holder 530 and the baffle plate 564.

The use of the ring-shaped element 10 as a focus ring ensures efficient etching of the substrate by the etcher 500.

Another embodiment of the present disclosure provides a method for etching a substrate 1 by the etcher 500. The method can be used to form a microelectronic circuit. For example, the method may include mounting the ring-shaped element 10 in the etcher 500 and arranging the substrate 1 such that the edge of the substrate is located on the upper surface 206 of the mounting portion, and operating the etcher to etch the substrate 1 in a predetermined pattern or manufacture a microelectronic component. The etcher may be a plasma etcher.

The use of the ring-shaped element 10 in the method enables the manufacture of an etched substrate or an electronic circuit device with few defects in an efficient manner.

The present disclosure will be explained in more detail with reference to the following examples. However, these examples are merely illustrative to assist in understanding the present disclosure and are not intended to limit the scope of the present disclosure.

Figure 8:
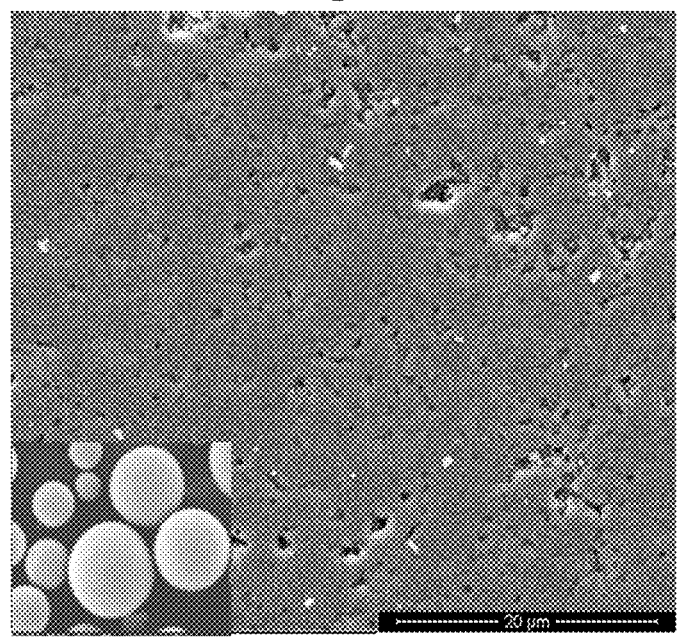
FIG. 8 is a surface electron microscopy image of a focus ring manufactured in Example 1, with the inset showing an electron microscopy image of granulated particles.
Figure 9:
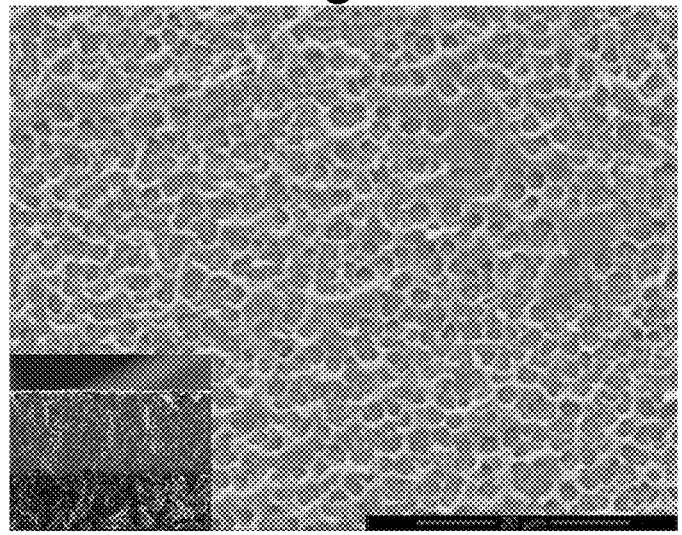
FIG. 9 is a surface electron microscopy image of a focus ring manufactured in Comparative Example 1, with the inset showing an image of a SiC film deposited on a substrate during manufacturing of the focus ring.

FIG. 8 is a surface electron microscopy image of a focus ring manufactured in Example 1, with the inset showing an electron microscopy image of granulated particles. FIG. 9 is a surface electron microscopy image of a focus ring manufactured in Comparative Example 1, with the inset showing an image of a SiC film deposited on a substrate during manufacturing of the focus ring. FIG. 10 shows (a) and (b) surface electron microscopy images of focus rings manufactured in Examples 4 and 7, respectively. FIG. 11 shows (a) and (b) fractured surface electron microscopy images of focus rings manufactured in Examples 7 and 8, respectively.

1. Production Examples 1 to 8: Manufacture of Focus Rings

Boron carbide particles (particle size $D_{50}$=0.7 μm) and carbon as raw materials were mixed with a solvent by ball milling in a slurry blender to prepare slurries of the raw materials. The amounts of the raw materials are shown in Table 1. Each of the slurries was spray dried to granulate the raw materials. An electron microscopy image of the granulated particles is shown in the inset of FIG. 8.

The granulated raw materials were filled in a rubber mold having a disc-shaped cavity, loaded into a CIP device, and pressurized to prepare a green body of a focus ring. The green body was processed into a size similar to that of a final focus ring (green processing), followed by carbonization. The carbonized green body was subjected to pressureless sintering in a sintering furnace to produce a sintered body. The surface of the sintered body was planarized. Thereafter, the shape of the sintered body was processed into the shape of a focus ring by wire discharge machining. The amounts of the raw materials used in Production Examples 1-8 and the sintering temperature and time conditions are summarized in Table 1.

2. Production Examples 9 to 14: Manufacture of Focus Rings

Boron carbide particles (particle size $D_{50}$=0.7 μm) were filled in the molding die illustrated in (a) of FIG. 7. The molding die was loaded into the system illustrated in FIG. 4. Sintering was performed under the temperature, pressure, and time conditions shown in Table 1 to manufacture focus rings.

3. Comparative Examples 1 to 3: Focus Rings

A focus ring was manufactured using polycrystalline SiC prepared by CVD (Comparative Example 1). Specifically, a SiC film was formed on a graphite substrate by deposition, the graphite substrate was removed, followed by shape processing and polishing to manufacture a focus ring. A cross-sectional image of the SiC-deposited sample on the graphite substrate is shown in the inset of FIG. 9. A surface image of the sample after plasma resistance testing is shown in FIG. 9.

A focus ring was manufactured using single-crystal Si (100,111) (Comparative Example 2).

A home-made WC focus ring was used (Comparative Example 3). For details of the manufacture of the WC focus ring, see Korean Patent No. 10-1870051 in the name of the present applicant.

3. Evaluation of Physical Properties (1) Relative Density Evaluation and Surface Observation Relative densities (%) were measured by the Archimedes method. The results are shown in Table 2. Surface characteristics were observed with an electron microscope. The images are shown in the accompanying drawings. In Table 2, "-" means not measured.

(2) Thermal Conductivity, Resistance, and Etch Rate

Thermal conductivities (W/m·K) were measured using a laser flash apparatus (LFA457 MICROFLASH® by NETZCH).

Resistivities (Ω·cm) were measured using a surface resistance meter (MCP-T610 by MITSUBISHI CHEMICAL).

(3) Etch Rate and Determination of Whether Particles were Formed

Etch rates (%) were measured at the same temperature under the same atmosphere in a plasma etcher operated at an RF power of 2000 W.

A determination of whether particles were formed was made based on the presence or absence of particles in the atmosphere for etch rate measurement or in the chamber of the system after measurement.

The results of evaluations are presented in Tables 2 and 3.

TABLE 1

| Production Example No. | Additive 1 (wt %) | Additive 2 (wt %) | Boron carbide powder (wt %) | Sintering temperature (° C.) | Sintering time (h) | Pressure (MPa) | Remarks |
|---|---|---|---|---|---|---|---|
| 1 | 20 | 0 | Remainder | 2380 | 10 | Ambient pressure | $B_4C$ |
| 2 | 20 | 0 | Remainder | 2380 | 15 | Ambient pressure | $B_4C$ |
| 3 | 10 | 0 | Remainder | 2380 | 15 | Ambient pressure | $B_4C$ |
| 4 | 0 | 5 | Remainder | 2380 | 15 | Ambient pressure | $B_4C$ |
| 5 | 0 | 10 | Remainder | 2380 | 15 | Ambient pressure | $B_4C$ |
| 6 | 0 | 15 | Remainder | 2380 | 15 | Ambient pressure | $B_4C$ |
| 7 | 10 | 5 | Remainder | 2380 | 15 | Ambient pressure | $B_4C$ |
| 8 | 20 | 0 | Remainder | 2380 | 15 | Ambient pressure | $B_4C$ |
| 9 | 10 | 0 | Remainder | 1950 | 5 | 25 | $B_4C$ |
| 10 | 0 | 5 | Remainder | 1950 | 5 | 25 | $B_4C$ |
| 11 | 0 | 10 | Remainder | 1950 | 5 | 25 | $B_4C$ |
| 12 | 0 | 15 | Remainder | 1950 | 5 | 25 | $B_4C$ |
| 13 | 10 | 5 | Remainder | 1950 | 5 | 25 | $B_4C$ |
| 14 | 0 | 0 | 100 | 1950 | 5 | 25 | $B_4C$ |
| Comparative Example 1 | — | — | — | — | — | — | CVD-SiC |
| Comparative Example 2 | — | — | — | — | — | — | Si |
| Comparative Example 3 | — | — | — | — | — | — | WC |

\* Carbon was used as the additive 1.
\*\* Boron oxide was used as the additive 2.

TABLE 2

| Production Example No. | Thermal conductivity at 25° C. | Thermal conductivity at 200° C. | Thermal conductivity at 400° C. | Thermal conductivity at 600° C. | Thermal conductivity at 800° C. | $HC_{25}$:$HC_{800}$ | Surface observation |
|---|---|---|---|---|---|---|---|
| 1 | — | — | — | — | — | — | FIG. 8 |
| 2 | 31.665 | 26.764 | 22.481 | 19.2 | 16.625 | 0.525 | — |
| 3 | 30.269 | 25.29 | 21.144 | 18.162 | 15.684 | 0.518 | — |
| 4 | — | — | — | — | — | — | (a) of FIG. 10 |
| 7 | — | — | — | — | — | — | (b) of FIG. 10 |
| 14 | 23.659 | 13.307 | 9.419 | 7.497 | 6.315 | 0.269 | — |
| Comparative Example 1 | 265.526 | 165.251 | 116.373 | 85.045 | 68.312 | 0.257 | FIG. 9 |

TABLE 3

| Production Example No. | Relative density | Etch rate (%) (1) | Etch rate (%) (2) | Determination of whether particles were formed upon contact with fluorine ions | Observation of fractured surface |
|---|---|---|---|---|---|
| 1 | 90.76 | — | — | — | — |
| 2 | 93.11 | 86.22 | — | x | — |
| 3 | 94.14 | — | — | — | — |
| 4 | 94.32 | — | — | — | — |
| 5 | 95.42 | — | — | — | — |
| 6 | 94.35 | — | — | — | — |
| 7 | 97.43 | 61.54 | 40 | x | (a) of FIG. 11 |
| 14 | 99.9 | 59.39 | 36 | x | (b) of FIG. 11 |
| Comparative Example 1 | — | 100 | 62 | x | — |
| Comparative Example 2 | — | — | 100 | x | — |
| Comparative Example 3 | — | — | 51 | o | — |

As can be seen from the results in Tables 2 and 3, the relative densities of the samples of Production Examples 1-14 were high overall. The surface observation reveals that carbon areas were relatively uniformly distributed.

Particularly, the sample of Production Example 14 had a very high relative density and its fractured surface was found to be highly dense. That is, the sample of Production Example 14 had a dense structure in which pores were not substantially observed.

The sample of Production Example 5, which was manufactured using boron oxide as a sinterability enhancer, had a higher relative density than the sample of Production Example 3, which was manufactured using the same amount of carbon. The sample of Production Example 7, which was manufactured using a combination of carbon and boron oxide, had a much higher relative density than the samples manufactured under the same sintering conditions.

The thermal conductivities of the samples of Production Examples 2, 3, and 14 were found to be relatively constant in a wide temperature range, which were distinguished from those of the silicon carbide focus ring of Comparative Example 1. The samples of Production Examples 2, 7, and 14 had much lower etch rates than the silicon carbide, tungsten carbide, and single-crystal silicon focus rings, indicating better corrosion resistance of the samples of Production Examples 2, 7, and 14. In addition, the samples of Production Examples 2, 7, and 14 did not form particles upon contact with fluorine ions in the plasma environment, suggesting that higher precision etching of the samples will not lead to the formation of more defects.

The ring-shaped element of the present disclosure includes boron carbide whose thermal conductivity is maintained in a constant range. The use of the ring-shaped element ensures efficient etching of a substrate. In addition, the replacement period of the ring-shaped element is extended. According to the method of the present disclosure, a substrate can be etched with improved efficiency.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A method of manufacturing a ring-shaped element for an etcher, the method comprising:
    preparing a slurry by mixing a raw material comprising boron carbide and a sinterability enhancer with a solvent;
    drying the slurry to form a granulated raw material;
    molding the granulated raw material to form a green body:
    carbonizing and sintering the green body to produce a sintered body; and
    shaping the sintered body into the ring-shaped element for the etcher,
    wherein the sinterability enhancer comprises carbon, and
    wherein the sinterability enhancer is present in the raw material in an amount ranging from 13% to 23% by weight.

2. The method of claim 1,
    wherein the carbon comprises at least one selected from the group consisting of a polymer resin, a carbonized form of the polymer resin, and combinations thereof.

3. The method of claim 1,
    wherein the sinterablilty enhancer comprises boron oxide and carbon, and
    wherein a weight ratio of boron oxide to carbon in the sinterability enhancer ranges from 1:0.8 to 1:4.

4. The method of claim 3,
    wherein the raw material comprises from 1% to 9% by weight of boron oxide and from 5% to 15% by weight of carbon.

5. The method of claim 1, wherein the solvent comprises at least one selected from the group consisting of an alcohol-based substance, water, and combinations thereof, and wherein the slurry comprises from 60% to 80% by volume of the solvent.

6. The method of claim 1, wherein the granulation process comprises spraying the slurry to evaporate the solvent and form the granulated raw material.

7. The method of claim 1, wherein a particle diameter ($D_{50}$) of the raw material ranges from 0.3 μm to 1.5 μm.

8. The method of claim 1, wherein the molding operation comprises filling the granulated raw material into a mold and pressing the filled raw material, and wherein the pressing is performed at a pressure ranging from 100 MPa to 200 MPa.

9. The method of claim 1, wherein the carbonizing is performed at a temperature ranging from 600° C. to 900° C.

10. The method of claim 1, wherein the sintering is performed by maintaining a temperature ranging from 1800° C. to 2500° C. for a duration of 10 hours to 20 hours.

11. The method of claim 1, wherein the sintering operation comprises:

maintaining a temperature from 100° C. to 250° C. for 20 to 40 minutes;

maintaining a temperature from 250° C. to 350° C. for 4 to 8 hours; and maintaining a temperature from 360° C. to 500° C. for 4 to 8 hours.

12. The method of claim 1, wherein the sintering is performed under pressureless conditions.

13. The method of claim 1, wherein the shaping is performed by electrical discharge wire machining.

* * * * *